UNITED STATES PATENT OFFICE.

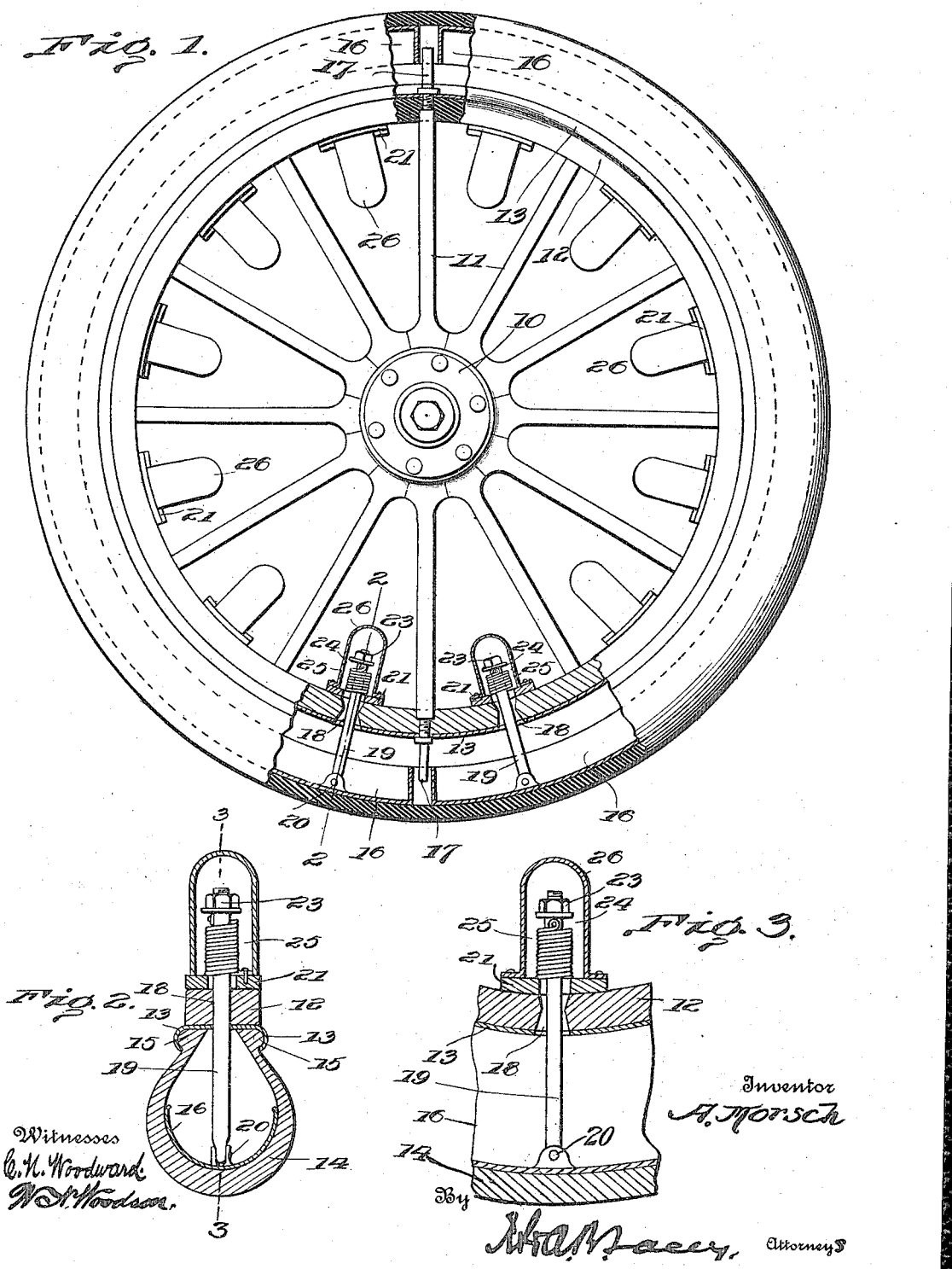

ARTHUR MORSCH, OF TRIUMPH, ILLINOIS.

SPRING-TIRE.

1,188,008.

Specification of Letters Patent.

Patented June 20, 1916.

Application filed July 13, 1914. Serial No. 850,766.

*To all whom it may concern:*

Be it known that I, ARTHUR MORSCH, citizen of the United States, residing at Triumph, in the county of La Salle and State of Illinois, have invented certain new and useful Improvements in Spring-Tires, of which the following is a specification.

This invention relates to improvements in spring tires used upon wheels employed under automobiles and similar vehicles, and has for one of its objects to produce a simply constructed tire construction possessing the same resilient qualities as the ordinary pneumatic tire without danger of puncture.

Another object of the invention is to provide a device of this character which may be employed without structural change in connection with the ordinary pneumatic tire casings.

With these and other objects in view, the invention consists in certain novel features of construction as hereinafter shown and described and then specifically pointed out in the claim; and in the drawings illustrative of the preferred embodiment of the invention Figure 1 is a side elevation partly in section of a wheel and its rim with a tire constructed in accordance with the invention. Fig. 2 is an enlarged transverse section on the line 2—2 of Fig. 1. Fig. 3 is a section on the line 3—3 of Fig. 2.

The improved device may be applied to the ordinary tire casings employed in connection with inflatable tubes and commonly known as pneumatic tire casings and attached by clencher rims or flanges to the inturned flanges of the wheel rim, and requires no change in the casing rim or felly except a plurality of apertures formed through the felly and rim to receive spring supporting clamp bolts. The wheel is shown complete in Fig. 1 and comprises the hub portion 10, spokes 11, felly or inner rim 12, outer or clencher rim 13 with the tire casing 14 having clencher flanges 15 engaging the inturned flanges of the rim 13 of the wheel, these parts being of the usual construction.

The improvement comprises semi-circular segmental members 16 inserted within the casing 14, and preferably formed of sheet metal curved both transversely and longitudinally to conform to and adapted to be disposed within the casing in the space usually occupied by the expansive tube, and are slightly spaced apart at their confronting ends. Extending from the felly portion 12 of the wheel and rigidly supported therein are stop members or rods 17 as shown in Fig. 1 which prevent the members 16 from displacement circumferentially of the wheel while leaving them free to be moved inwardly toward the hub.

At suitable intervals apertures indicated at 18 are formed through the felly 12 and the rim 13 to receive guide bolts or rods 19. The rods 19 are pivoted at their outer ends as indicated at 20 to the members 16 and extend inwardly through the apertures 18 and project for a considerable distance beyond the inner face of the felly. Surrounding each bolt 19 and bearing against the inner face of the felly is a guide plate or washer 21 which is bolted or otherwise secured to the felly 12. At its inner end each bolt is threaded to receive a nut 23 and likewise provided with a transverse pin 24 near the nut. Surrounding each bolt 19 is a spring 25 which is connected at one end to the pin 24 and rigidly coupled at its other end to the washer 21. By this means the spring is arranged to exert a pulling force upon the bolt 19 and force the members 16 against the inner face of the casing member 14, and maintaining the rotundity of the latter. When no pressure is applied, the pulling force of the springs is exerted to maintain the casing 14 in its outwardly extended condition, but when pressure is applied to the axle and the wheel depressed, the springs, which for the time being are in downward position, are extended by the compression of the casing and produce the same effect as the ordinary pneumatic tire, and when the pressure is removed, the reaction of the springs will return the casing to its normal position.

Any required number of springs may be employed, but will generally correspond to the number of spokes, one of the spring supported bolts being located between adjacent spokes as illustrated in Fig. 1, but it is not desired to limit the number of bolts employed, as they may be increased or decreased in number as required.

The improved device is simple in construction, can be inexpensively applied, produces an efficient, resilient wheel which possesses all of the advantages of a pneumatic tired wheel without danger of puncture deterioration.

The apertures 18 are in elongated form to prevent the cramping of the parts 19 when the load is applied to the axle. A hood 26 is preferably arranged over each of the inwardly projecting rods 19 and its spring, as shown, to protect the same. Each of these hoods 26 is in the nature of a metal cap open at one end and provided with oppositely disposed radial ears, it being observed that the said hoods are mounted with the ears thereof seating upon the washers 21 to be secured thereto in any suitable manner, as illustrated in the drawing.

Having thus described the invention, what is claimed as new is:—

A wheel including a felly having a hollow tire mounted thereon, semi-circular segments fitting within the tire, a plurality of guide members swingingly connected to each of said segments and projecting freely through the felly, yieldable means engaging the inner ends of said rods for urging the segments radially of the felly, and oppositely disposed radial stop rods secured to the felly upon opposite sides thereof and projecting between the confronting ends of said segments.

In testimony whereof I affix my signature in presence of two witnesses.

ARTHUR MORSCH. [L. S.]

Witnesses:
CECILE M. HILL,
HARRISON G. WORSLEY.

Copies of this patent may be obtained for five cents each, by addressing the "Commissioner of Patents, Washington, D. C."